Dec. 4, 1923.
W. T. BARKER
1,476,437
SHAFT LOCKING MEANS
Filed Jan. 7, 1922
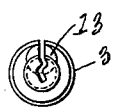
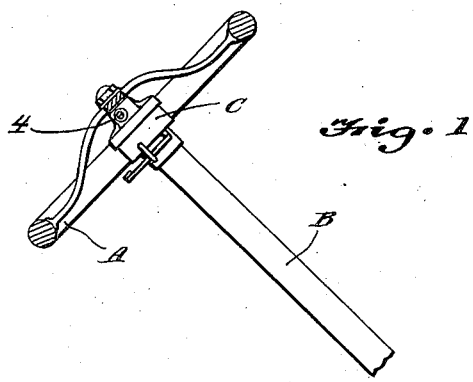
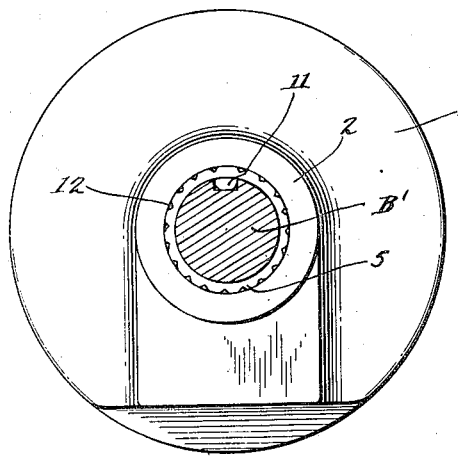
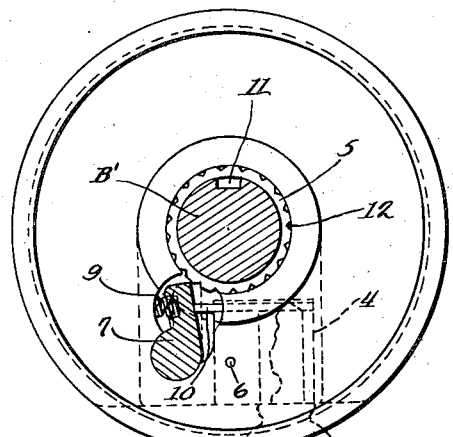
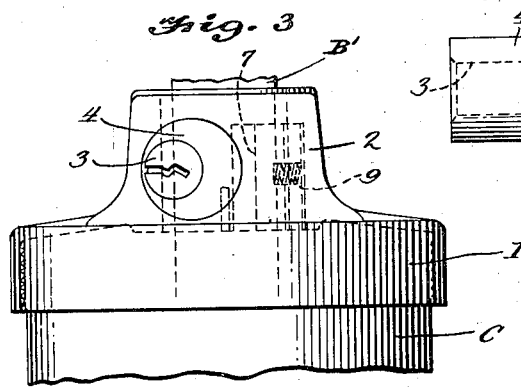
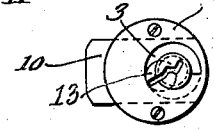
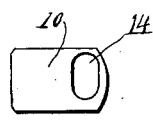
INVENTOR
William T. Barker
BY Gray and Lilly
ATT'YS Patented Dec. 4, 1923.

1,476,437

UNITED STATES PATENT OFFICE.

WILLIAM T. BARKER, OF ANGOLA, INDIANA.

SHAFT-LOCKING MEANS.

Application filed January 7, 1922. Serial No. 527,541.

*To all whom it may concern:*

Be it known that I, WILLIAM T. BARKER, residing at Angola, in the county of Steuben and State of Indiana, and a citizen of the United States, have invented certain new and useful Improvements in Shaft-Locking Means, of which the following is a specification.

My invention relates to a certain new and improved shaft locking means which can be used for locking any shaft against rotation. It is suitable for locking driving shafts, as of motor vehicles, though its value is by no means restricted to such drive shafts, or may be used to lock the steering post of vehicles, as of automobiles, bicycles or the like. When applied for the latter purpose, the lock may be used to secure the post against rotation in one direction, after the wheels have been turned to one side of a straight line, so that the vehicle cannot be driven forward by unauthorized persons, thus preventing theft of the vehicle in the owner's absence.

It is an object of my invention to construct a locking means that will be especially positive in operation, afford great resistance to force applied to break the parts and overcome the lock mechanism, the relative arrangements of the parts being such as to afford great strength without unduly increasing the weight thereof.

It is a further object of the invention to construct a locking means that will permit rotation of the shaft to which it is applied in one direction only and to a limited degree, in case the invention is applied to a vehicle steering post, but which does not permit return of the shaft to its neutral position after having been once turned, until it is released by suitable release mechanism, as a key. This permits moving the vehicle, for a short distance, as in case of fire.

Another object is to provide a locking means for a shaft that can be applied with little removal of parts; as for example, in the use for a steering post of the type having planetary gear reduction, the differential casing need not be removed to mount the lock in operative position. The simplicity of the construction is found to possess a decided advantage in the ease with which it may be mounted on the post just beneath the steering wheel, in the type having the gear case at the upper end of the post, without changing other parts than those furnished with the locking unit.

These objects, and other advantages which will be described hereinafter, I attain in the following manner, reference being had to the accompanying drawings in which—

Figure 1 is an elevation partly in section of the improvement mounted on the usual steering post, the same being shown on a small scale, Figure 2 is a top plan view of the locking mechanism, the wheel shaft being in section, Figure 3 is a view in elevation of the mechanism, Figure 4 is a bottom plan view of the parts shown in Fig. 2, the pivoted pawl element being shown in transverse section, Figures 5, 6, and 7 are views of the lock cylinders and associated parts, 5 being a side elevation while 6 and 7 are end views showing the unlocked and locked positions respectively, and Figures 8, 9 and 10 are detail views of lock parts.

The invention will be described as applied to the steering mechanism of motor vehicles, though it may be used as well in locking drive or other shafts from rotation, either in vehicles or in other machines.

Referring to the drawings, B represents the usual steering post housing at the top of which is a gear casing C, for reduction gearing as used by some cars to give greater power of control to the wheel A. These parts are quite conventional in construction and need not be described with greater detail. These parts are mounted concentrically with the steering wheel A as usual, the upper end of the casing C being externally threaded to receive the internal threads of a cover flange 1 which supports an upper extending hollow body 2, the two latter parts being integral and designed to carry the lock mechanism which is the particular feature of my invention.

The usual cover member on the top of the casing, as generally used on many cars—particularly of the Ford type—is intended to be removed and replaced by the parts 1 and 2 as above stated. My lock mechanism is of the Yale type having the usual cylinders 3 and 4, and these parts are inserted transversely of the body 2 by drilling a socket of the proper size into said body and securing cylinder 4 against rotation therein by a pin 6.

The key cylinder 3 is eccentric to the cylinder 4, one end of the large cylinder having a rectangular slot there across to receive therein the sliding plate member 10, the latter also having a transverse slot 14 therein in which works the eccentric head 13 of the cylinder 3 the rotation of which, by cam action, actuates the plate 10. The latter plate is shown in the outwardly-extended position in Fig. 6 and in withdrawn position in Fig. 7. It is held in the said slot 14 by a detachable plate 11a.

Parallel to the parts 1, 2, B and C, are drilled two other openings which are intersecting cylinders forming a suitable combined opening or cavity to receive therein an elongated pawl 7 whose axis fits quite closely one cylindrical part of the opening while the other or toe part of the pawl is quite freely movable in the other. This pawl element 7 is shown vertically in dotted lines as an elongated body in Fig. 3; and in cross section in Fig. 4, in each case appearing elongated in the line parallel with the shaft B'. The transverse cylinder 4 also intersects the vertical opening in which the toe of the pawl is movable, so that as the plate 10 of the lock is thrust forward by the key, the said toe part of the pawl is moved out of engagement with the teeth 12 of the ratchet bushing 5, later to be described. The side of the toe opposite the bushing has a seat therein to receive the end of the compression spring 9 which normally secures the pawl in engagement with the ratchet bushing 5.

The cylindrical bushing or sleeve 5 encircles the shaft B' and is usually fastened thereon by means of a key 11. In certain types of cars, such a bushing is used in any case, whether to be used with a lock or without, but it is not notched as in this case but smooth surfaced externally as well as internally. The bushing here shown is provided externally with longitudinal teeth which are parallel with the pawl 7 and shaft B' to enable it to serve as a ratchet. This can be done by removing the plain bushing (if the one present has one) and cutting suitable teeth therein and then replacing in its accustomed position; it may however be advantageous to furnish a ratchet bushing with the locking mechanism so that the purchaser may substitute the ratchet bushing for the original one, just as he may substitute the flanged cover part and projection—parts 1 and 2, for such original structures.

It will be evident that it is not essential to the operativeness of this mechanism that it shall be applied to a steering post or to a steering wheel shaft. It may as well be used in locking any shaft against rotation relative to a part mounted without it. All that is necessary for its intended use is that the shaft shall be provided with a ratchet bushing or cylinder or that it shall itself be provided with ratchet teeth, and it is clear that such bushing can be supplied to a driving shaft wherever needed and then the fixed external part may carry the pawl, as may be desired. In fact, any frame part external to the shaft may be locked to the latter by the spring 9 and unlocked by the lock elements 3, 4, 8, 10, 13, to be carried by the said frame member. This enables it, of course, to be used for locking steering posts of cars quite different from that of the "Ford" type. For example, the carrying element for the lock mechanism need not be immediately beneath the steering wheel—it is immaterial where about the steering column the said element is mounted. It is only essential that it shall be adjacent the shaft and adjacent the ratchet bushing on the shaft so that the pawl will engage the teeth of the ratchet.

In operation, this improved mechanism is intended to normally lock the fixed casing and shaft together, the spring continuously pressing against the pawl to cause the latter to engage the teeth of the ratchet at all times except when the plate 10 is actuated by the key to overcome the said spring and thrust the pawl back out of operative engagement. It will be noted that when the parts are shown in unlocked position as in Fig. 6, that the eccentric head 13 is in neutral position with reference to the axis of the cylinder 3, so that the said head and plate will remain in unlocked position when the key is removed, though the spring 9 is opposing such position.

It is to be noted that when the improvement is applied to a reduction gearing and its casing, the shaft B', to which the ratchet bushing is keyed, is a short shaft secured to the wheel A above and to the central gear of the gear system within the case C, so that by locking this shaft B' to the case will lock the steering shaft (not shown), carrying the planet gears, against rotation. The connection between the said short shaft and the main steering shaft by said reduction gearing being long well known, further description will be unnecessary, as no claim is made thereto. It will be clear of course that locking the short shaft will lock the main steering shaft and therefore the steering wheels of the vehicle.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. The combination with a steering shaft of a vehicle, of a locking means therefor including a pivoted engaging member mounted in a fixed frame and normally spring-pressed into engagement with said shaft for preventing rotation thereof, a plunger element for engaging the said member to release the same from engagement with said shaft, a key-actuated rotatable cylinder for carrying the plunger element, and eccentric means on said cylinder for actuating the plunger element, substantially as described.

2. The combination with a steering shaft of a vehicle and ratchet and pawl mechanism for normally locking the said shaft against rotation, of a lock mechanism including two cylinders one being mounted eccentrically within the other, the larger having a transverse slot across one end thereof and a plate slidable transversely of said cylinder and in said slot and having a transverse slot therein, and the smaller cylinder having an eccentric projection at one end fitting in the slot in the plate, so that rotation of the smaller cylinder will actuate the plate longitudinally to unlock the ratchet and pawl mechanism, and key means for actuating the small cylinder, substantially as described.

3. The combination with a steering wheel of a vehicle, a stud shaft secured thereto, and a hollow casing mounted therebelow and fixed to the steering post housing, of a cover member for said casing having an upwardly projecting extension receiving through it the said stub shaft, a ratchet bushing secured to and having teeth parallel with the said shaft, a pawl member mounted in said extension and normally engaging said teeth to lock the shaft against rotation in one direction, a slidable plunger adapted to move transverse of the pawl for releasing the same, and key-actuated cylinder means adjacent the pawl for actuating the plunger, substantially as described.

4. The combination with a steering shaft of a vehicle, of a locking means therefor including a pivoted member carried by a frame part and normally spring-pressed into engagement with said shaft for preventing rotation thereof in one direction, a plunger element movably longitudinally for engaging such pivoted member to releasing the same, a key-actuated cylinder rotatably mounted in a frame part, and eccentric mechanism on said cylinder for actuating the plunger element, substantially as described.

5. The combination with a steering shaft of a vehicle and ratchet and pawl mechanism for normally locking the said shaft against rotation, of a lock mechanism including a cylinder mounted rotatably in a frame part and having a transverse slot across one end thereof and a plate slidable transversely of said cylinder and in said slot and having a transverse slot therein, said cylinder having an eccentric projection at one end fitting in the slot in the plate, so that rotation of the cylinder will actuate the plate longitudinally to unlock the ratchet and pawl mechanism, and key means for actuating the cylinder, substantially as described.

In testimony whereof I hereunto affix my signature.

WILLIAM T. BARKER.